(12) United States Patent
Kraus et al.

(10) Patent No.: US 11,933,696 B2
(45) Date of Patent: Mar. 19, 2024

(54) MICROTOME

(71) Applicant: PFM MEDICAL AG, Cologne (DE)

(72) Inventors: Steffen Kraus, Sandhausen (DE); Erwin Schneider, Nussloch (DE)

(73) Assignee: PFM MEDICAL AG, Cologne (DE)

( * ) Notice: Subject to any disclaimer, the term of this patent is extended or adjusted under 35 U.S.C. 154(b) by 409 days.

(21) Appl. No.: 17/428,186

(22) PCT Filed: Jul. 6, 2020

(86) PCT No.: PCT/DE2020/200055
§ 371 (c)(1),
(2) Date: Aug. 3, 2021

(87) PCT Pub. No.: WO2021/043376
PCT Pub. Date: Mar. 11, 2021

(65) Prior Publication Data
US 2022/0120642 A1   Apr. 21, 2022

(30) Foreign Application Priority Data
Sep. 3, 2019 (DE) .................. 10 2019 213 363.0

(51) Int. Cl.
*G01N 1/06* (2006.01)
(52) U.S. Cl.
CPC ......... *G01N 1/06* (2013.01); *G01N 2001/065* (2013.01)
(58) Field of Classification Search
CPC ....... G01N 1/06; G01N 1/04; G01N 2001/065
See application file for complete search history.

(56) References Cited

U.S. PATENT DOCUMENTS

| | | |
|---|---|---|
| 3,628,386 A | 12/1971 | Blum |
| 3,785,234 A | 1/1974 | Sitte |
| (Continued) | | |

FOREIGN PATENT DOCUMENTS

| | | |
|---|---|---|
| DE | 1772189 B | 8/1970 |
| DE | 3400982 C1 | 12/1991 |
| (Continued) | | |

OTHER PUBLICATIONS

International Search Report and Written Opinion for PCT/DE2020/200055 (ISA/EP) dated Nov. 3, 2020 (15 pages).
(Continued)

*Primary Examiner* — Phong H Nguyen
(74) *Attorney, Agent, or Firm* — ALSTON & BIRD LLP (57) ABSTRACT

The invention relates to a microtome, in particular a rotary microtome (1), comprising a micrometer mechanism (3) having a drive (2) for producing a relative movement between an object holder (4) and a blade and a positioning device acting on the micrometer mechanism (3) to influence the relative movement, the positioning device comprising an advancing device (6) and a trimming device (7) interacting with the advancing device (6), said microtome being designed and modified with regard to a simple and reliable adjustment of the trimming device (7) as well as activation/deactivation of a retraction by structurally simple means in such a way that the positioning device has a combined actuating device (8) for both an adjustment of the trimming device (7) and also an activation/deactivation of a retraction which can be carried out by means of the advancing device (6).

20 Claims, 4 Drawing Sheets

(56) References Cited

U.S. PATENT DOCUMENTS

| | | | | |
|---|---|---|---|---|
| 2013/0186248 A1* | 7/2013 | Heid | ........................ | G01N 1/06 |
| | | | | 83/530 |
| 2015/0143970 A1* | 5/2015 | Johe | ........................ | G01N 1/06 |
| | | | | 83/821 |
| 2016/0245728 A1* | 8/2016 | Walter | .................... | G01N 1/286 |
| 2017/0284904 A1* | 10/2017 | Lim | ........................ | H05F 3/04 |
| 2017/0336299 A1* | 11/2017 | Luttenberger | ........... | G01N 1/06 |
| 2018/0136087 A1 | 5/2018 | Buixuan et al. | | |

FOREIGN PATENT DOCUMENTS

| | | | |
|---|---|---|---|
| DE | 4205258 | A1 | 6/1993 |
| DE | 10-2009-006386 | A1 | 8/2010 |
| DE | 102011112450 | A1 | 3/2013 |
| EP | 3246690 | A1 | 11/2017 |

OTHER PUBLICATIONS

1st Office Action for German Patent Application No. 102019009163.9 dated Nov. 30, 2023 (6 pages).

\* cited by examiner

MICROTOME

CROSS REFERENCE TO RELATED APPLICATIONS

This application is a national stage application, filed under 35 U.S.C. § 371, of International Application No. PCT/DE2020/200055, filed Jul. 6, 2020, which international application claims priority to and the benefit of German Application No. 10 2019 213 363.0, filed Sep. 3, 2019; the contents of both of which as are hereby incorporated by reference in their entirety.

BACKGROUND

Technical Field

The invention relates to a microtome, in particular a rotary microtome, comprising a micrometric mechanism having a drive for producing a relative movement between an object holder and a blade and a positioning device which acts on the micrometric mechanism to influence the relative movement, wherein the positioning device comprises an advancing device and a trimming device which cooperates with the advancing device.

Description of Related Art

A microtome in the form of a rotary microtome of the abovementioned type is already known from DE 10 2011 112 450 A1, wherein the microtome comprises a micrometric mechanism having a drive for producing a relative movement between an object holder and a blade fixed in a blade holder. The drive moves the object holder substantially up and down, so that an object held by the object holder can be guided along the blade to produce cuts.

The known microtomes also have a positioning device, which acts on the micrometric mechanism to influence the relative movement between the object holder and the blade. Such a positioning device can comprise an advancing device and a trimming device which cooperates with the advancing device. In the known microtome, the advancing device is responsible for moving the object holder with the object a specifiable advancement distance to the blade or to the blade holder in the desired manner, so that cut after cut can be produced with the desired cut thickness as necessary. In the known microtome, the trimming device is provided to increase the advancement distance, preferably in specifiable different steps, to, for example at the beginning of producing cuts in a target region, initially remove thicker cuts of an outer region of the object in a time-saving manner in order to reach the actual target region of the object more quickly. A typical advancement distance can then be 2 or 3 µm and an increased advancement distance during trimming can be 10 µm or 20 µm, for example.

In a known microtome, a substantially 4-step relative movement between the object holder and the blade holder, or between the object and the blade, takes place during normal operation to produce a cut from an object. After a cutting movement of the object holder which, according to a 1st step, is typically substantially vertically downward, the object holder is retracted or pulled back in a 2nd step to produce a distance between the object and the knife, the object holder is moved substantially vertically upward in a 3rd step and, in a 4th step, the object holder is advanced or delivered in the direction of the blade, opposite to the retraction or pulling back, to then again carry out a substantially vertically downward cutting movement to produce a new cut. This is a combined vertical and horizontal motion.

This 4-step circle-shaped or circular movement of the object holder with the object relative to a typically stationary blade holder with an affixed blade, which is repeated to produce multiple cuts and could also be referred to as a pendular motion, is ultimately overlaid by an advancing movement with a typical advancement distance which takes into account the decrease in volume or thickness of the object due to the removed cuts or compensates for this decrease, in order to continuously produce cuts with the same desired cut thickness.

Practice has shown that, in some applications, it is desirable to work without retracting the object holder when producing cuts, which preserves the blade and reduces noise during operation of the microtome. In this case, in the microtome discussed above as an example, the object holder carries out only an up and down movement with the overlaid advancing movement in order to produce cuts. A retraction and an advancement opposite to the retraction in accordance with the 2nd and 4th steps discussed above does not take place.

BRIEF SUMMARY

The underlying object of the present invention is therefore to specify a microtome of the abovementioned type, according to which a simple and safe adjustment of the trimming device and activation/deactivation of a retraction is made possible with structurally simple means.

The aforementioned object is achieved according to the invention by a microtome having the features of the broadest claim accompanying herein. The microtome according to the invention is accordingly configured and further developed such that the positioning device comprises a combined actuating device for both adjusting the trimming device and also activating/deactivating a retraction that can be carried out by means of the advancing device.

According to the invention, it was first recognized that the aforementioned object is achieved in a surprisingly simple manner by a clever configuration of an actuating device of the positioning device. For this purpose, in a further manner according to the invention, the positioning device comprises a combined actuating device. The combination consists in that the combined actuating device enables adjusting the trimming device and also activating/deactivating a retraction that can be carried out by means of the advancing device. The actuating device according to the invention is thus a multifunctional device, which can advantageously be operated with the same hand of a user in order to accomplish both functions. The other hand remains free for other tasks. The combined configuration of the actuating device to accomplish two functions with one actuating device provides a space-saving and elegant configuration of the microtome without overloading the microtome with multiple different actuating elements.

The microtome according to the invention consequently provides a microtome with which a simple and safe adjustment of the trimming device and activation/deactivation of a retraction is made possible with structurally simple means.

In terms of a particularly simple actuation of the positioning device, the actuating device can comprise a rotating mechanism for adjusting the trimming device and/or for activating/deactivating the retraction. A rotating mechanism can be implemented for one of the two mentioned functions or, alternatively, for both functions.

In terms of a particularly simple actuation of the positioning device, the actuating device can furthermore comprise a pressing mechanism for adjusting the trimming device and/or for activating/deactivating the retraction. A pressing mechanism can be implemented for one of the two mentioned functions or, alternatively, for both functions.

In this respect, any combinations of a rotating mechanism and a pressing mechanism can be implemented, whereby the selection of the use of these mechanisms has to be based on the individual application. A pressing mechanism for adjusting the trimming device and a rotating mechanism for activating/deactivating the retraction can advantageously be implemented in a combined actuating device, for example. For each selection of the use of the mentioned mechanisms, the combined actuating device enables a combined adjustment of the trimming device and activation/deactivation of the retraction.

In terms of a particularly simple and functionally reliable configuration of the microtome, the rotating mechanism can comprise a shaft, which is preferably disposed parallel to an advancing direction, whereby the shaft can be operatively connected to a sliding element which acts on the advancing device or on the trimming device such that a rotation of the shaft about a shaft axis results in a translatory movement of the sliding element, preferably in a sliding direction perpendicular to the advancing direction. Such a shaft makes it possible to enable a rotational movement in a simple manner. An arrangement of the shaft parallel to an advancing direction makes a very compact design of the microtome possible. The sliding element acting on the trimming device allows a rotational movement of the shaft to be converted into a translatory movement of the sliding element. The sliding element can thus effect a sliding or displacement of a functional element of the trimming device in order to enable an adjustment of the trimming device. The operative connection between the shaft and the sliding element can be carried out in different ways, for example via an articulated connection or a connection using a suitable linkage.

In a structurally particularly simple manner, the sliding element can be substantially bar-shaped or rod-shaped and comprise an engaging portion or engaging element for an engaging element or an engaging portion of the positioning device, in particular the advancing device. The engaging portion of the sliding element can be configured as a recess in the sliding element, which can engage with a projecting engaging element of the positioning device. Alternatively, the engaging element of the sliding element can be configured as a projection or a projecting engaging element, which can engage with a recess of the positioning device. The specific implementation of the engagement process between the sliding element and the positioning device depends on the respective application.

In terms of a structurally particularly simple design, the shaft can furthermore be substantially tube-shaped, preferably configured substantially as a round tube, comprising an engaging portion or engaging element configured in or on the shaft for engagement with an engaging element or engaging portion on or in the sliding element. The tube-shaped configuration or the configuration as a round tube provides the option to dispose even more functional elements in the space in the shaft. A pressing mechanism for the operation or actuation of at least one further functional element can be disposed here, for example. The engaging portion in the shaft or in the sliding element can be configured as a recess, or a corresponding engaging element of the sliding element or the shaft can be configured as a projection or a projecting engaging element. A complementary configuration of the respective engaging portion and the respective engaging element is particularly advantageous.

In terms of a particularly safe and wear-free operative connection between the sliding element and the shaft, the sliding element can comprise a coupling element which is pivotably articulated to the sliding element for operative connection with the shaft. This also allows any existing spatial offset between the shaft and the sliding element to be equalized or compensated. In a further advantageous configuration, the coupling element can comprise an engaging element which is pivotably articulated to the coupling element for engagement with the shaft. In the latter case, therefore, two additional components, namely the coupling element and the engaging element, act between the shaft and the sliding element. Depending on the application, two or even more such components can be implemented connected to one another in an articulated manner between the shaft and the sliding element and act to enable a particularly safe and wear-free operation of the rotating mechanism and thus the entire microtome with the additional capability of overcoming a spatial offset between the shaft and the sliding element.

In terms of a particularly simple and safe operation of the microtome, at least one specifiable rotational position of the shaft can furthermore be releasably lockable or fixable by means of a locking device of the shaft. This enables easy maintenance of a specifiable rotational position and thus a specifiable operating condition without the risk of an unintended adjustment of the rotational position. Locking or fixing by means of the locking device can be released again at any time to change the rotational position, for which purpose an additional release mechanism can be implemented if necessary.

In terms of a particularly simple rotation of the shaft, a control wheel or adjusting wheel for gripping with the hand of a user can be provided on the shaft, preferably at one end of the shaft. The control wheel or adjusting wheel can be roughened on its outer circumference, or configured with projections or knobs, to prevent a hand or fingers of a user from slipping when turning the shaft. In particular when a control wheel or adjusting wheel is implemented on the shaft and a pressing element or pressing region projects at least slightly from the control wheel or adjusting wheel, this region of the actuating device could be referred to as a multifunction button of the combined actuating device.

In terms of a particularly simple and functionally reliable configuration of the microtome, the pressing mechanism can comprise a bar-shaped or rod-shaped pressing element, which is preferably disposed parallel to an advancing direction, whereby the pressing element preferably comprises a manually operable pressing region at one end and an adjusting element that can be displaced by means of the pressing element at the other end. Such a pressing element makes it possible to enable a pressing process in a simple manner. An arrangement of the pressing element parallel to an advancing direction makes a very compact design of the microtome possible. Depending on the requirement, the pressing element can be composed of a plurality of differently dimensioned elements, for example round rod elements of different thicknesses, which are coupled to one another in a longitudinal direction to form an elongated pressing element. The pressing region can be thickened and/or flattened, for example, to allow easy pressing of the pressing element with one finger or the thumb of one hand. The adjusting element disposed or preferably integrally formed at the end of the pressing element facing away from the pressing region is used for coupling to or operative connection with the positioning device, in particular the trimming device or the advancing device.

In terms of safe operation of the microtome and in particular the actuating device, the adjusting element can comprise a substantially cuboid, in particular block-like, portion having at least two horizontal portions configured at different heights for engagement with a control element of the positioning device, preferably the trimming device. When cooperating with a trimming device and in particular with a control element of a trimming device, the control element can engage either with one of the horizontal portions or with none of the horizontal portions during operation in order to set different trim values, for example 10 µm on one horizontal portion and 20 µm on another horizontal portion. Depending on the pressing depth of the pressing element, the control element can engage with one of the horizontal portions or with none of the horizontal portions. This enables a particularly reliable and safe specification of trim values or other adjustment parameters.

In a structurally particularly elegant and space-saving configuration, the pressing element can be displaceably disposed in the shaft of the rotating mechanism, whereby the pressing element or the pressing region can project from the shaft at least in the unactuated state of the pressing mechanism. A particularly compact implementation of the combined actuating device is achieved by disposing the pressing element in the shaft of the rotating mechanism. This results in a quasi-integrated design of the rotating mechanism and the pressing mechanism. For safe actuation of the pressing element, the pressing element or the pressing region can project from the shaft at least in the unactuated state of the pressing mechanism. The pressing element can thus be accessed reliably, even when it is integrated or disposed in the shaft of the rotating mechanism.

To implement a particularly convenient operation of the microtome, the pressing element can cooperate with a spring mechanism and a latching mechanism for releasably fixing different pressing depths for the pressing element in the shaft and the associated implemented different trim values, wherein the spring mechanism and/or the latching mechanism are or is preferably disposed or configured in the shaft. The spring mechanism allows the pressing element to be pressed in against a spring force, and allows the pressing element to be disengaged, assisted by the spring force, when the pressing element is released. A suitable spring can be mounted in the shaft of the rotating mechanism. In cooperation with the latching mechanism, a releasable fixation of the pressing element in different pressing depths in the shaft is made possible. This allows different trim values to be set in the respective latching position. The latching mechanism can be formed by suitable projections or depressions in the pressing element and latching elements of the shaft that cooperate with said projections or depressions. Alternatively, the pressing element can comprise corresponding latching elements and the shaft can comprise suitable projections or depressions to form the latching mechanism.

In one design example of the microtome, a rotary microtome can be implemented with a monolithic housing, which enables a highly stable, simple and vibration-free operation of the microtome. The retraction can be activated or deactivated via a control wheel or adjusting wheel, for example, in the front region of the microtome. A simple on-off switch can be implemented here using the rotating mechanism described above, for example. The trimming can further advantageously be integrated into this rotating mechanism by means of the pressing mechanism described above, whereby a pressing element can project from the control wheel or adjusting wheel.

BRIEF DESCRIPTION OF THE FIGURES

There are various ways to advantageously configure and further develop the teaching of the present invention. For this purpose, reference is made to the subordinate claims on the one hand and, on the other hand, to the following discussion of a preferred design example of the microtome according to the invention on the basis of the drawing. In the context of the explanation of the preferred design example on the basis of the drawing, other generally preferred configurations and further developments of the teaching are discussed as well. In the drawing, the figures show FIG. 1 in a perspective view, a design example of a microtome according to the invention in the form of a rotary microtome, FIG. 2 in a perspective view, the micrometric mechanism and the actuating device of the microtome of FIG. 2, wherein the micrometric mechanism and the actuating device are not coupled to one another in this illustration for the sake of clarity, FIG. 3 in a further perspective view, the micrometric mechanism and the actuating device of FIG. 2, wherein the actuating device is shown partly in a longitudinal section, and FIG. 4 in a view from below, the micrometric mechanism and the actuating device of FIG. 2.

DETAILED DESCRIPTION OF VARIOUS EMBODIMENTS

Figure 1:
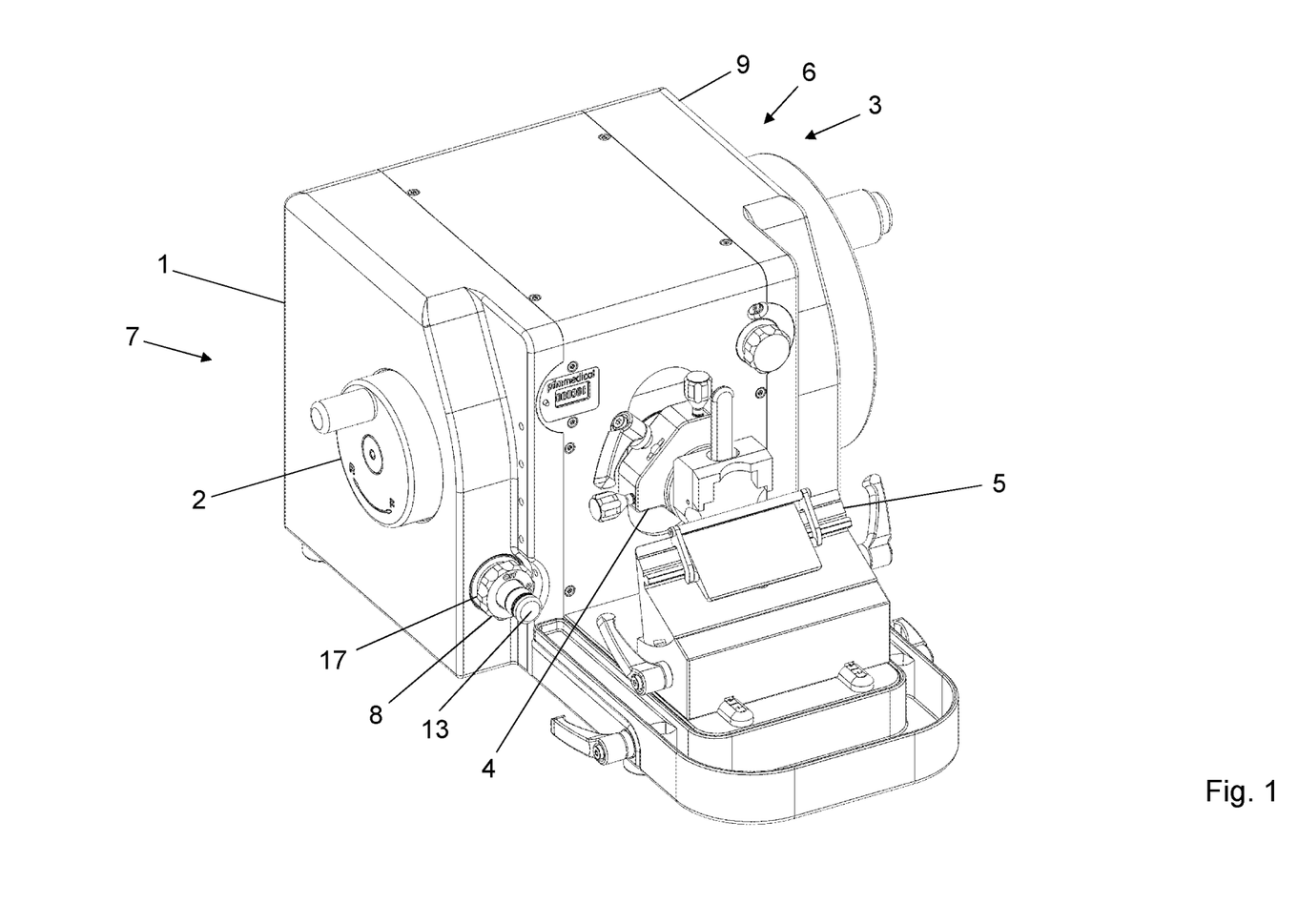

FIG. 1 shows a design example of a microtome according to the invention in the form of a rotary microtome 1 in a perspective view, wherein the rotary microtome 1 comprises a micrometric mechanism 3 having a drive 2 for producing a relative movement between an object holder 4 and a blade holder 5 or a blade. The micrometric mechanism 3 is not visible in FIG. 1, because it is disposed in a housing 9 of the rotary microtome 1. The rotary microtome 1 further comprises a positioning device, which acts on the micrometric mechanism 3 to influence the relative movement. The positioning device comprises an advancing device 6 and a trimming device 7 which cooperates with the advancing device 6. Neither the advancing device 6 nor the trimming device 7 can specifically be seen in FIG. 1, because they are likewise disposed in the housing 9.

In terms of a particularly simple and safe actuation of the microtome, the positioning device comprises a combined actuating device 8 for both adjusting the trimming device 7 and also activating/deactivating a retraction that can be carried out by means of the advancing device 6.

Figure 2:
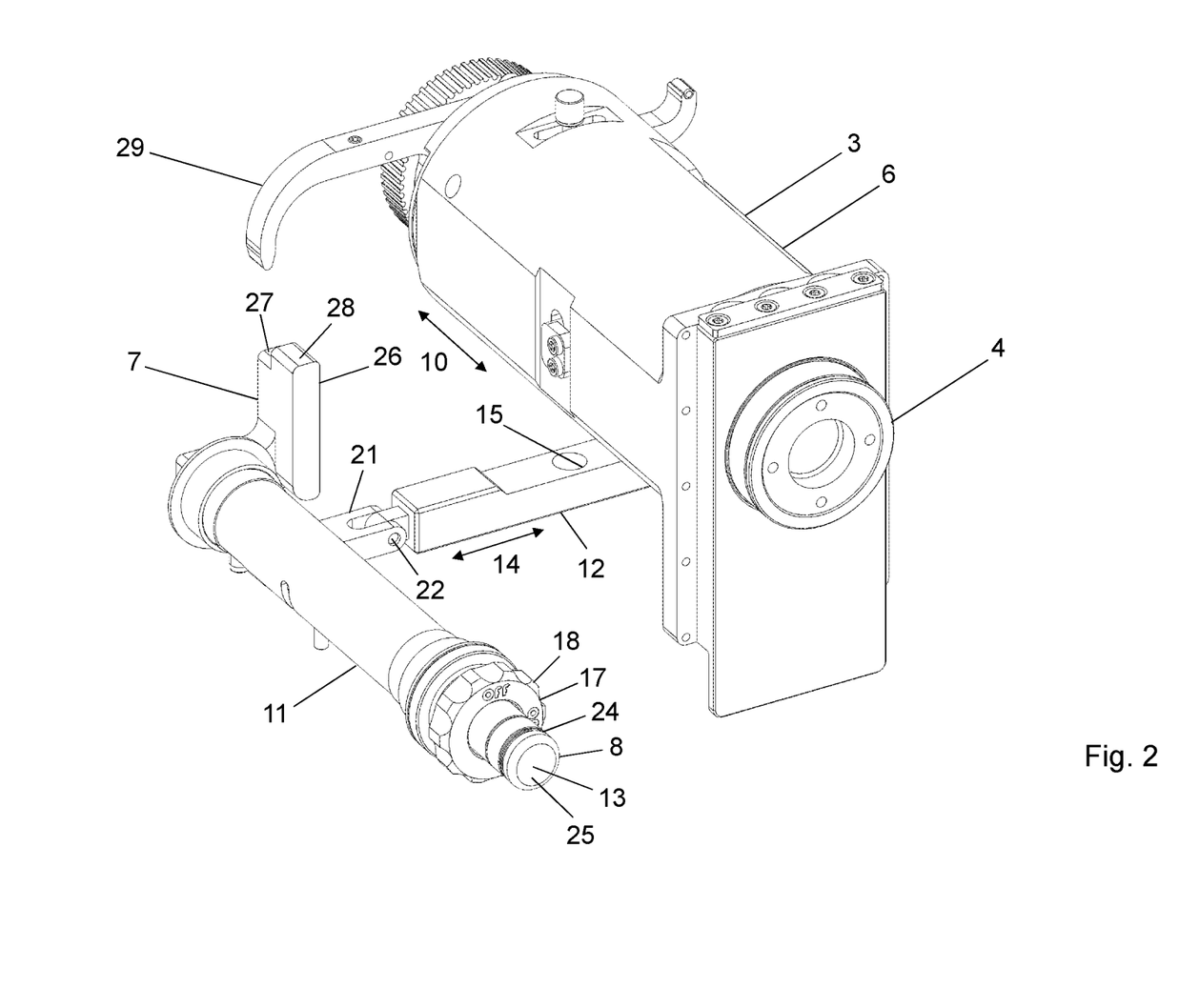
Figure 3:
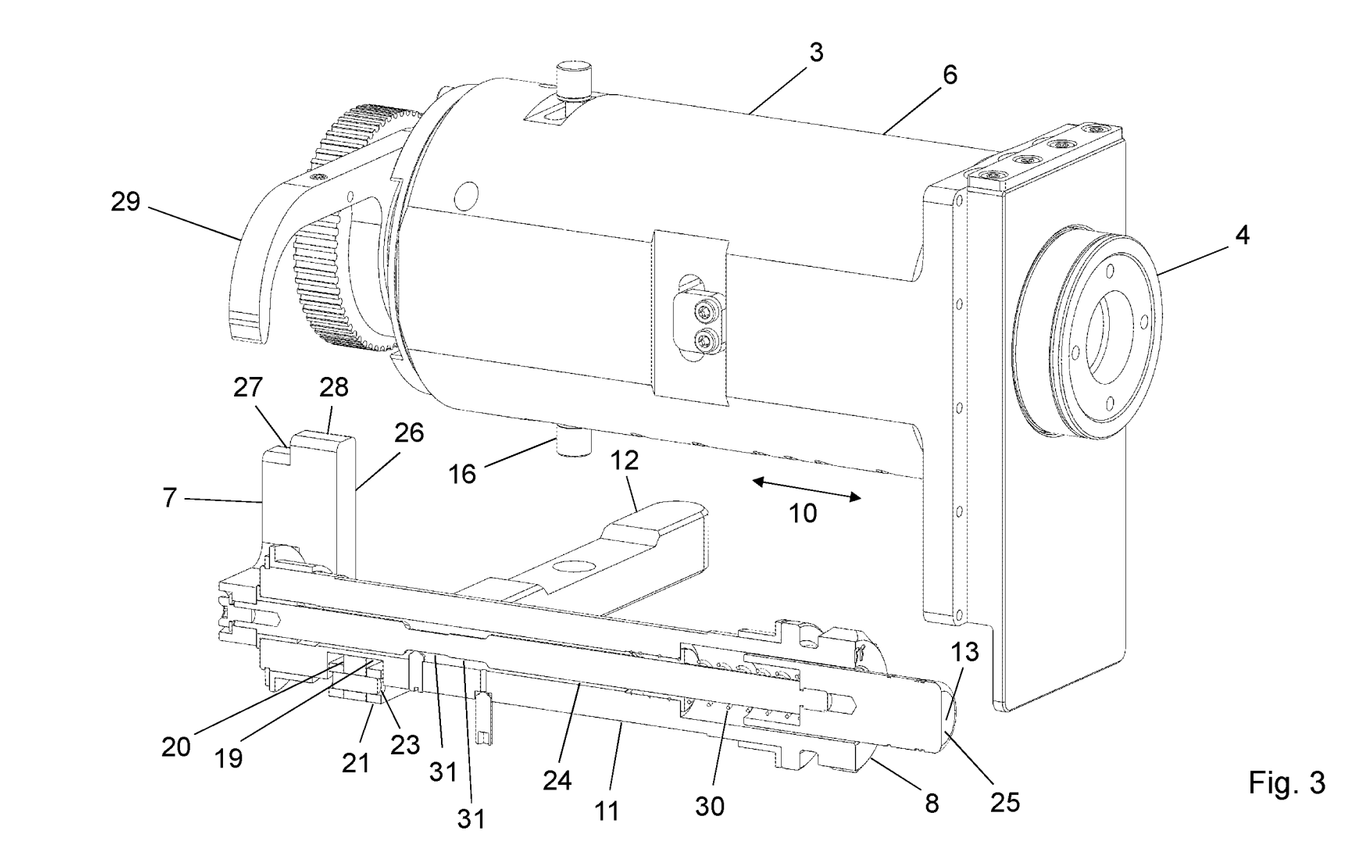
Figure 4:
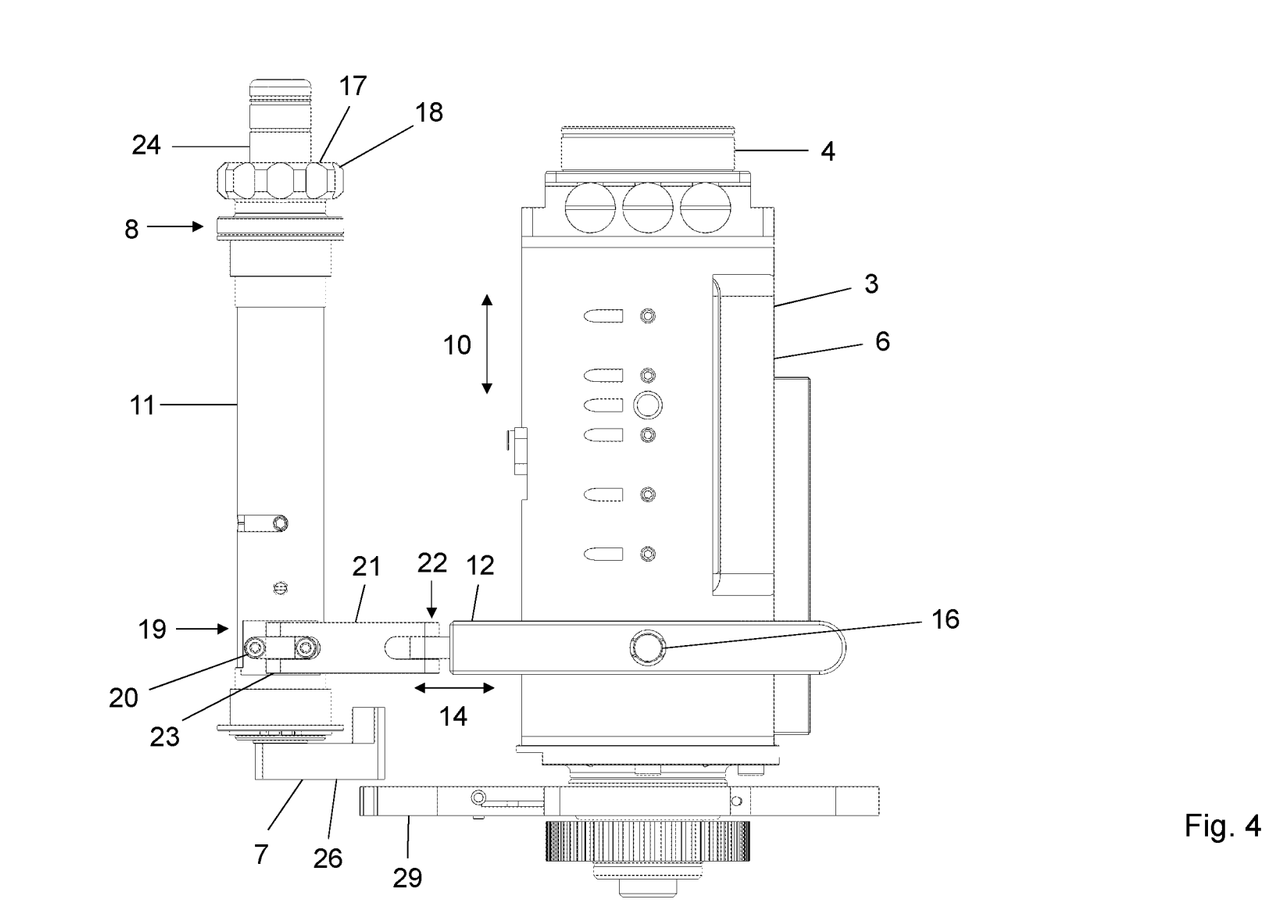

FIGS. 2 and 3 show perspective views and FIG. 4 shows a view from below of the micrometric mechanism 3 and the actuating device 8 in a state in which they are not installed in the housing 9. The actuating device 8 comprises a rotating mechanism for activating and deactivating the retraction during the relative movement and a pressing mechanism for activating and deactivating and adjusting the trimming device 7. For this purpose, the actuating device 8 is configured as a combined actuating device 8.

The rotating mechanism comprises a shaft 11 which is disposed parallel to an advancing direction 10, whereby the shaft 11 is operatively connected or coupled to a sliding element 12 which acts on the advancing device 6 such that rotation of the shaft 11 about a shaft axis 13 results in a translatory movement of the sliding element 12 in a sliding direction 14 perpendicular to the advancing direction 10. The sliding element 12 is substantially bar-shaped or rod-shaped and comprises an engaging portion configured as a recess 15 for an engaging element of the advancing device 6. By rotating the shaft 11 about the shaft axis 13, the sliding element 12 is displaced in sliding direction 14, whereby, depending on the direction of rotation, engagement between the recess 15 and the engaging element 16 leads to an activation or a deactivation of the retraction of the relative movement produced by the advancing device 6. In doing so, the engaging element 16 is displaced on the advancing device 6. A control wheel 17 comprising knobs 18 is disposed on the shaft 11, whereby the shaft 11 can be rotated by means of the control wheel 17 to switch between an "on" state (activation) and an "off" state (deactivation) of the retraction.

The shaft 11 is tube-shaped and comprises an engaging portion which is configured in the shaft 11 in the form of a recess 19 for engagement with an engaging element 20 of the sliding element 12. A safe conversion of a rotational movement of the shaft 11 into a translatory movement of the sliding element 12 can therefore be achieved.

The sliding element 12 comprises a coupling element 21, which is pivotably articulated to the sliding element 12, for operative connection with the shaft 11. The coupling element 21 pivots relative to the sliding element 12 about a pivot axis 22. The engaging element 20 is pivotably articulated to the sliding element 12 at the end of the coupling element 21 facing away from the sliding element 12. This pivoting movement takes place about a pivot axis 23.

The pressing mechanism for adjusting the trimming device 7 comprises a rod-shaped pressing element 24, which is disposed parallel to the advancing direction 10. The pressing element 24 is disposed in the tube-shaped shaft 11 in order to form a combined actuating device 8. At one end, the pressing element 24 comprises a manually operable pressing region 25 and, at an opposite end, an adjusting element 26 which can be displaced by means of the pressing element 24.

The adjusting element 26 comprises a substantially cuboid section having two horizontal portions 27, 28 configured at different heights for engagement with a control element 29 of the trimming device 7. During operation, the control element 29 cooperates either with one of the two horizontal portions 27, 28, or with neither of said portions 27, 28. Different trim values can be set depending on the cooperation of the horizontal portions 27, 28 with the control element 29. The engagement of the control element 29 with the adjusting element 26 or the horizontal portions 27, 28 is adjusted via the pressing depth of the pressing element 24 in the shaft 11 and thus via the extent or the distance of the displacement of the adjusting element 26. Different pressing depths correspond to different trim values.

The pressing element 24 is displaceably disposed or mounted in the shaft 11 of the rotating mechanism, whereby the pressing element 24 or the pressing region 25 projects from the shaft 11 at least in the unactuated state of the pressing mechanism. The pressing element 24 also cooperates with a spring mechanism comprising a spring 30 and a latching mechanism for releasably fixing different pressing depths of the pressing element 24 in the shaft 11. With these different pressing depths, different trim values are implemented. The spring mechanism and the latching mechanism are disposed in the shaft 11, whereby the latching mechanism comprises recesses 31 in the pressing element 24 which cooperate with a projection 32 in the shaft 11. The spring 30 is configured as a helical spring or a spiral spring, although, in principle, other springs, such as leaf springs, could be used as well.

The microtome according to the invention consequently provides a microtome with which a simple and safe adjustment of the trimming device and activation/deactivation of a retraction is made possible with structurally simple means.

In terms of a particularly simple actuation of the positioning device, the actuating device can comprise a rotating mechanism for adjusting the trimming device and/or for activating/deactivating the retraction. A rotating mechanism can be implemented for one of the two mentioned functions or, alternatively, for both functions.

In terms of a particularly simple actuation of the positioning device, the actuating device can furthermore comprise a pressing mechanism for adjusting the trimming device and/or for activating/deactivating the retraction. A pressing mechanism can be implemented for one of the two mentioned functions or, alternatively, for both functions.

In this respect, any combinations of a rotating mechanism and a pressing mechanism can be implemented, whereby the selection of the use of these mechanisms has to be based on the individual application. A pressing mechanism for adjusting the trimming device and a rotating mechanism for activating/deactivating the retraction can advantageously be implemented in a combined actuating device, for example. For each selection of the use of the mentioned mechanisms, the combined actuating device enables a combined adjustment of the trimming device and activation/deactivation of the retraction.

In terms of a particularly simple and functionally reliable configuration of the microtome, the rotating mechanism can comprise a shaft, which is preferably disposed parallel to an advancing direction, whereby the shaft can be operatively connected to a sliding element which acts on the advancing device or on the trimming device such that a rotation of the shaft about a shaft axis results in a translatory movement of the sliding element, preferably in a sliding direction perpendicular to the advancing direction. Such a shaft makes it possible to enable a rotational movement in a simple manner. An arrangement of the shaft parallel to an advancing direction makes a very compact design of the microtome possible. The sliding element acting on the trimming device allows a rotational movement of the shaft to be converted into a translatory movement of the sliding element. The sliding element can thus effect a sliding or displacement of a functional element of the trimming device in order to enable an adjustment of the trimming device. The operative connection between the shaft and the sliding element can be carried out in different ways, for example via an articulated connection or a connection using a suitable linkage.

In a structurally particularly simple manner, the sliding element can be substantially bar-shaped or rod-shaped and comprise an engaging portion or engaging element for an engaging element or an engaging portion of the positioning device, in particular the advancing device. The engaging portion of the sliding element can be configured as a recess in the sliding element, which can engage with a projecting engaging element of the positioning device. Alternatively, the engaging element of the sliding element can be configured as a projection or a projecting engaging element, which can engage with a recess of the positioning device. The specific implementation of the engagement process between the sliding element and the positioning device depends on the respective application.

In terms of a structurally particularly simple design, the shaft can furthermore be substantially tube-shaped, preferably configured substantially as a round tube, comprising an engaging portion or engaging element configured in or on the shaft for engagement with an engaging element or engaging portion on or in the sliding element. The tube-shaped configuration or the configuration as a round tube provides the option to dispose even more functional elements in the space in the shaft. A pressing mechanism for the operation or actuation of at least one further functional element can be disposed here, for example. The engaging portion in the shaft or in the sliding element can be configured as a recess, or a corresponding engaging element of the sliding element or the shaft can be configured as a projection or a projecting engaging element. A complementary configuration of the respective engaging portion and the respective engaging element is particularly advantageous.

In terms of a particularly safe and wear-free operative connection between the sliding element and the shaft, the sliding element can comprise a coupling element which is pivotably articulated to the sliding element for operative connection with the shaft. This also allows any existing spatial offset between the shaft and the sliding element to be equalized or compensated. In a further advantageous configuration, the coupling element can comprise an engaging element which is pivotably articulated to the coupling element for engagement with the shaft. In the latter case, therefore, two additional components, namely the coupling element and the engaging element, act between the shaft and the sliding element. Depending on the application, two or even more such components can be implemented connected to one another in an articulated manner between the shaft and the sliding element and act to enable a particularly safe and wear-free operation of the rotating mechanism and thus the entire microtome with the additional capability of overcoming a spatial offset between the shaft and the sliding element.

In terms of a particularly simple and safe operation of the microtome, at least one specifiable rotational position of the shaft can furthermore be releasably lockable or fixable by means of a locking device of the shaft. This enables easy maintenance of a specifiable rotational position and thus a specifiable operating condition without the risk of an unintended adjustment of the rotational position. Locking or fixing by means of the locking device can be released again at any time to change the rotational position, for which purpose an additional release mechanism can be implemented if necessary.

In terms of a particularly simple rotation of the shaft, a control wheel or adjusting wheel for gripping with the hand of a user can be provided on the shaft, preferably at one end of the shaft. The control wheel or adjusting wheel can be roughened on its outer circumference, or configured with projections or knobs, to prevent a hand or fingers of a user from slipping when turning the shaft. In particular when a control wheel or adjusting wheel is implemented on the shaft and a pressing element or pressing region projects at least slightly from the control wheel or adjusting wheel, this region of the actuating device could be referred to as a multifunction button of the combined actuating device.

In terms of a particularly simple and functionally reliable configuration of the microtome, the pressing mechanism can comprise a bar-shaped or rod-shaped pressing element, which is preferably disposed parallel to an advancing direction, whereby the pressing element preferably comprises a manually operable pressing region at one end and an adjusting element that can be displaced by means of the pressing element at the other end. Such a pressing element makes it possible to enable a pressing process in a simple manner. An arrangement of the pressing element parallel to an advancing direction makes a very compact design of the microtome possible. Depending on the requirement, the pressing element can be composed of a plurality of differently dimensioned elements, for example round rod elements of different thicknesses, which are coupled to one another in a longitudinal direction to form an elongated pressing element. The pressing region can be thickened and/or flattened, for example, to allow easy pressing of the pressing element with one finger or the thumb of one hand. The adjusting element disposed or preferably integrally formed at the end of the pressing element facing away from the pressing region is used for coupling to or operative connection with the positioning device, in particular the trimming device or the advancing device.

In terms of safe operation of the microtome and in particular the actuating device, the adjusting element can comprise a substantially cuboid, in particular block-like, portion having at least two horizontal portions configured at different heights for engagement with a control element of the positioning device, preferably the trimming device. When cooperating with a trimming device and in particular with a control element of a trimming device, the control element can engage either with one of the horizontal portions or with none of the horizontal portions during operation in order to set different trim values, for example 10 μm on one horizontal portion and 20 μm on another horizontal portion. Depending on the pressing depth of the pressing element, the control element can engage with one of the horizontal portions or with none of the horizontal portions. This enables a particularly reliable and safe specification of trim values or other adjustment parameters.

In a structurally particularly elegant and space-saving configuration, the pressing element can be displaceably disposed in the shaft of the rotating mechanism, whereby the pressing element or the pressing region can project from the shaft at least in the unactuated state of the pressing mechanism. A particularly compact implementation of the combined actuating device is achieved by disposing the pressing element in the shaft of the rotating mechanism. This results in a quasi-integrated design of the rotating mechanism and the pressing mechanism. For safe actuation of the pressing element, the pressing element or the pressing region can project from the shaft at least in the unactuated state of the pressing mechanism. The pressing element can thus be accessed reliably, even when it is integrated or disposed in the shaft of the rotating mechanism.

To implement a particularly convenient operation of the microtome, the pressing element can cooperate with a spring mechanism and a latching mechanism for releasably fixing different pressing depths for the pressing element in the shaft and the associated implemented different trim values, wherein the spring mechanism and/or the latching mechanism are or is preferably disposed or configured in the shaft. The spring mechanism allows the pressing element to be pressed in against a spring force, and allows the pressing element to be disengaged, assisted by the spring force, when the pressing element is released. A suitable spring can be mounted in the shaft of the rotating mechanism. In cooperation with the latching mechanism, a releasable fixation of the pressing element in different pressing depths in the shaft is made possible. This allows different trim values to be set in the respective latching position. The latching mechanism can be formed by suitable projections or depressions in the pressing element and latching elements of the shaft that cooperate with said projections or depressions. Alternatively, the pressing element can comprise corresponding latching elements and the shaft can comprise suitable projections or depressions to form the latching mechanism.

In one design example of the microtome, a rotary microtome can be implemented with a monolithic housing, which enables a highly stable, simple and vibration-free operation of the microtome. The retraction can be activated or deactivated via a control wheel or adjusting wheel, for example, in the front region of the microtome. A simple on-off switch can be implemented here using the rotating mechanism described above, for example. The trimming can further advantageously be integrated into this rotating mechanism by means of the pressing mechanism described above, whereby a pressing element can project from the control wheel or adjusting wheel.

Lastly, it must expressly be noted that the above described design example serves only to explain the claimed teaching, but does not limit said teaching to this design example.

The invention claimed is:

1. A rotary microtome (1), comprising:
   a micrometric mechanism (3) having a drive (2) for producing a relative movement between an object holder (4) and a blade; and
   a positioning device which acts on the micrometric mechanism (3) to influence the relative movement,
   wherein:
      the positioning device comprises an advancing device (6) and a trimming device (7) which cooperates with the advancing device (6),
      the positioning device comprises a combined actuating device (8) that comprises:
         a pressing mechanism for adjusting the trimming device (7), and
         a rotating mechanism for at least one of activating or deactivating a retraction that can be carried out by the advancing device (6), and
      the pressing mechanism comprises a rod-shaped or bar-shaped pressing element (24).

2. The rotary microtome (1) according to claim 1, wherein:
   the rotating mechanism comprises a shaft (11) which is disposed parallel to an advancing direction (10), and
   the shaft (11) is operatively connected to a sliding element (12) which acts on the advancing device (6) or on the trimming device (7) such that a rotation of the shaft (11) about a shaft axis (13) results in a translatory movement of the sliding element.

3. The rotary microtome (1) according to claim 2, wherein translatory movement of the sliding element is in a sliding direction (14) perpendicular to the advancing direction.

4. The rotary microtome (1) according to claim 2, wherein the sliding element (12) is bar-shaped or rod-shaped and comprises an engaging portion for an engaging element (16) or an engaging portion of the positioning device.

5. The rotary microtome (1) according to claim 2, wherein the shaft (11) is tube-shaped and comprising an engaging portion configured in or on the shaft (11) for engagement with an engaging element (20) oron or in the sliding element (12).

6. The rotary microtome (1) according to claim 5, wherein the shaft (11) is a round tube.

7. The rotary microtome (1) according to claim 2, wherein the sliding element (12) comprises a coupling element (21) which is pivotably articulated to the sliding element (12) for operative connection with the shaft (11).

8. The rotary microtome (1) according to claim 7, wherein the coupling element (21) comprises an engaging element (20) which is pivotably articulated to the coupling element (21) for engagement with the shaft (11).

9. The rotary microtome (1) according to claim 2, wherein at least one rotational position of the shaft (11) can be releasably locked or fixed by a locking device of the shaft (11).

10. The rotary microtome (1) according to claim 1, wherein:
    the rotating mechanism comprises a shaft (11) which is disposed parallel to an advancing direction (10), and
    the shaft (11) is operatively connected to a sliding element (12) which acts on the advancing device (6) or on the trimming device (7) such that a rotation of the shaft (11) about a shaft axis (13) results in a translatory movement of the sliding element.

11. The rotary microtome (1) according to claim 1, wherein the pressing rod-shaped or bar-shaped pressing element (24) is disposed parallel to an advancing direction (10).

12. The rotary microtome (1) according to claim 1, wherein the pressing element (24) comprises a manually operable pressing region (25) at one end and an adjusting element (26) which can be displaced by the pressing element (24) at the other end.

13. The rotary microtome (1) according to claim 12, wherein the adjusting element (26) comprises a cuboid portion having at least two horizontal portions (27, 28) configured at different heights for engagement with a control element (29) of the positioning device.

14. The rotary microtome (1) according to claim 13, wherein the engagement is with the trimming device (7).

15. The rotary microtome (1) according to claim 12, wherein:
    the pressing element (24) is displaceably disposed in the shaft (11) of the rotating mechanism, and
    the pressing element (24) or the pressing region (25) can project from the shaft (11) at least in the unactuated state of the pressing mechanism.

16. The rotary microtome (1) according to claim 12, wherein the pressing element (24) cooperates with a spring mechanism and a latching mechanism for releasably fixing different pressing depths for the pressing element (24) in the shaft (11) and the associated implemented different trim values.

17. The rotary microtome (1) according to claim 16, wherein the spring mechanism and/or the latching mechanism are or is preferably disposed or configured in the shaft (11).

18. A rotary microtome (1), comprising:
    a micrometric mechanism (3) having a drive (2) for producing a relative movement between an object holder (4) and a blade; and
    a positioning device which acts on the micrometric mechanism (3) to influence the relative movement,
    wherein:
       the positioning device comprises an advancing device (6) and a trimming device (7) which cooperates with the advancing device (6), and
       the positioning device comprises a combined actuating device (8) for both adjusting the trimming device (7) and at least one of activating or deactivating a retraction that can be carried out by the advancing device (6), the combined actuating device (8) comprises a pressing mechanism for the adjusting of the trimming device (7), and the pressing mechanism comprises a rod-shaped or bar-shaped pressing element (24).

19. The rotary microtome (1) according to claim 18, wherein:

the pressing element (24) is displaceably disposed in the shaft (11) of the rotating mechanism, and the pressing element (24) can project from the shaft (11) at least in the unactuated state of the pressing mechanism.

20. The rotary microtome (1) according to claim 18, wherein:

the pressing element (24) comprises a manually operable pressing region (25) at one end and an adjusting element (26) which can be displaced by the pressing element (24) at the other end, the pressing region (25) can project from the shaft (11) at least in the unactuated state of the pressing mechanism.

* * * * *

UNITED STATES PATENT AND TRADEMARK OFFICE
CERTIFICATE OF CORRECTION

| | |
|---|---|
| PATENT NO. | : 11,933,696 B2 |
| APPLICATION NO. | : 17/428186 |
| DATED | : March 19, 2024 |
| INVENTOR(S) | : Steffen Kraus et al. |

It is certified that error appears in the above-identified patent and that said Letters Patent is hereby corrected as shown below:

In the Claims

In Column 11, Line 60, Claim 5, delete "oron" and insert -- on --, therefor.

Signed and Sealed this
Twenty-second Day of October, 2024

*Katherine Kelly Vidal*

Katherine Kelly Vidal
*Director of the United States Patent and Trademark Office*